United States Patent
Ramirez et al.

(10) Patent No.: US 10,572,451 B2
(45) Date of Patent: Feb. 25, 2020

(54) FILE SYSTEM STORAGE

(71) Applicant: Hewlett Packard Enterprise Development LP, Houston, TX (US)

(72) Inventors: Eric A. Ramirez, Houston, TX (US); Lee A. Preimesberger, Houston, TX (US); Trang Nguyet Muir, Houston, TX (US); Sangita Mohanlal Prajapati, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 655 days.

(21) Appl. No.: 15/114,384

(22) PCT Filed: Jan. 31, 2014

(86) PCT No.: PCT/US2014/014248
§ 371 (c)(1),
(2) Date: Jul. 26, 2016

(87) PCT Pub. No.: WO2015/116194
PCT Pub. Date: Aug. 6, 2015

(65) Prior Publication Data
US 2016/0342617 A1    Nov. 24, 2016

(51) Int. Cl.
*G06F 16/30* (2019.01)
*G06F 16/174* (2019.01)
*G06F 16/13* (2019.01)

(52) U.S. Cl.
CPC .......... *G06F 16/1744* (2019.01); *G06F 16/13* (2019.01)

(58) Field of Classification Search
CPC .................... G06F 17/30153; G06F 17/30091
USPC ....................................................... 707/812
See application file for complete search history.

(56) References Cited

U.S. PATENT DOCUMENTS

| 5,734,340 A * | 3/1998 | Kennedy ............... G06T 9/005 707/999.101 |
| 6,023,711 A * | 2/2000 | Bennett ................ G06F 12/08 707/999.205 |
| 7,200,603 B1 * | 4/2007 | Hitz .................... G06F 11/1451 707/999.202 |
| 7,415,489 B2 * | 8/2008 | Palapudi ........... G06F 17/30233 707/999.203 |

(Continued)

OTHER PUBLICATIONS

Ahn, S. et al.; Design, Implementation, and Performance Evaluation of Flash Memory-based File System on Chip, Nov. 3, 2005, 23 Pgs.

(Continued)

*Primary Examiner* — Hicham Skhoun
(74) *Attorney, Agent, or Firm* — Hewlett Packard Enterprise Patent Department

(57) ABSTRACT

A system for storing a file system can include writing a file system to a memory device, the file system including a plurality of files, a subset engine to determine a subset of the plurality of files, a marking engine to mark each file of the plurality of files that is not included in the subset as a not-for-use sector, a crosslinking engine to crosslink duplicate files of the subset, a compression engine to compress a directory structure and a file allocation table (FAT) associated with the subset; and a storing engine to store the compressed directory structure and FAT in the file system.

19 Claims, 3 Drawing Sheets

(56) References Cited

U.S. PATENT DOCUMENTS

| | | | | |
|---|---|---|---|---|
| 7,440,980 B2* | 10/2008 | Fletcher | ............... | G06F 8/61 |
| | | | | 707/999.203 |
| 7,676,481 B2* | 3/2010 | Kathuria | ............... | G06F 9/4493 |
| | | | | 707/999.101 |
| 8,108,645 B2 | 1/2012 | Brodeur et al. | | |
| 2006/0155791 A1* | 7/2006 | Tene | ............... | G06F 12/0269 |
| | | | | 707/999.206 |
| 2006/0259448 A1* | 11/2006 | Yeo | ............... | H03M 7/30 |
| | | | | 707/999.001 |
| 2008/0071748 A1* | 3/2008 | Wroblewski | ...... | G06F 17/30153 |
| | | | | 707/999.003 |
| 2008/0141242 A1* | 6/2008 | Shapiro | ............... | G06F 8/61 |
| | | | | 717/174 |
| 2008/0152235 A1* | 6/2008 | Bashyam | ......... | G06F 17/30153 |
| | | | | 382/224 |
| 2008/0196043 A1 | 8/2008 | Feinleib et al. | | |
| 2009/0235248 A1 | 9/2009 | Conrad | | |
| 2012/0030662 A1 | 2/2012 | Williams et al. | | |
| 2013/0263289 A1* | 10/2013 | Vijayan | ............ | G06F 17/30091 |
| | | | | 726/31 |

OTHER PUBLICATIONS

International Searching Authority, the International Search Report and the Written Opinion, dated Nov. 13, 2014, 10 Pages.

* cited by examiner

FILE SYSTEM STORAGE

BACKGROUND

Information can be stored on a server motherboard. For example, information can be stored in embedded flash storage, among other types of storage. Space allocated for such storage may be limited.

DETAILED DESCRIPTION

Examples herein can store files in an attached file allocation table (FAT)-based file system on a motherboard (e.g., a server motherboard) in a way that can reduce the storage footprint for various payloads. A file system (e.g., a FAT32 file system) including a plurality of files can be written to a storage area in a normalized format, for instance, where unique data can be stored only once. Storing data once can include storing a single copy of a particular file (e.g., a single copy of data comprising a file, a single filename associated with the file, etc.) rather than multiple copies of the file.

Singular storage of such files in accordance with examples herein can allow the customization and/or creation of multiple subsets of the file system. That is, in some examples, a specified portion of a file system, rather than the entire file system, can be presented to a particular host (e.g., computing device) based on one or more parameters associated with the host. Such parameters are described further below and can include, for example, location, language, operating system (OS) type, and/or platform, among other parameters. Customization can be carried out with minimal (or no) file system knowledge, such as during a Basic Input/Output system (BIOS) boot sequence, for instance, by sector swaps of blocks of virtualized storage.

As previously discussed, examples herein can store data (e.g., files) in a normalized format, thereby reducing storage footprint. Accordingly, examples herein can reduce storage footprint without the use of a compressed file system driver in an operating system (OS) of a host, or the use of another device (e.g., a baseboard management controller (BMC)) to intercept and/or decompress data for the host. Thus, examples herein can reduce storage footprint without any modifications to the file system made by an additional device, whereas previous approaches may utilize a device, such as a BMC, to write and/or modify the file system on a sharable area and alternatively present and remove it from the host.

Further, examples herein can prevent a particular host from reading data that may be harmful and/or irrelevant to it by presenting only a subset of a file system to the host rather than the entire file system. In a similar manner, examples herein can prevent users from accessing unlicensed content without the need for encryption of the content.

Figure 1:
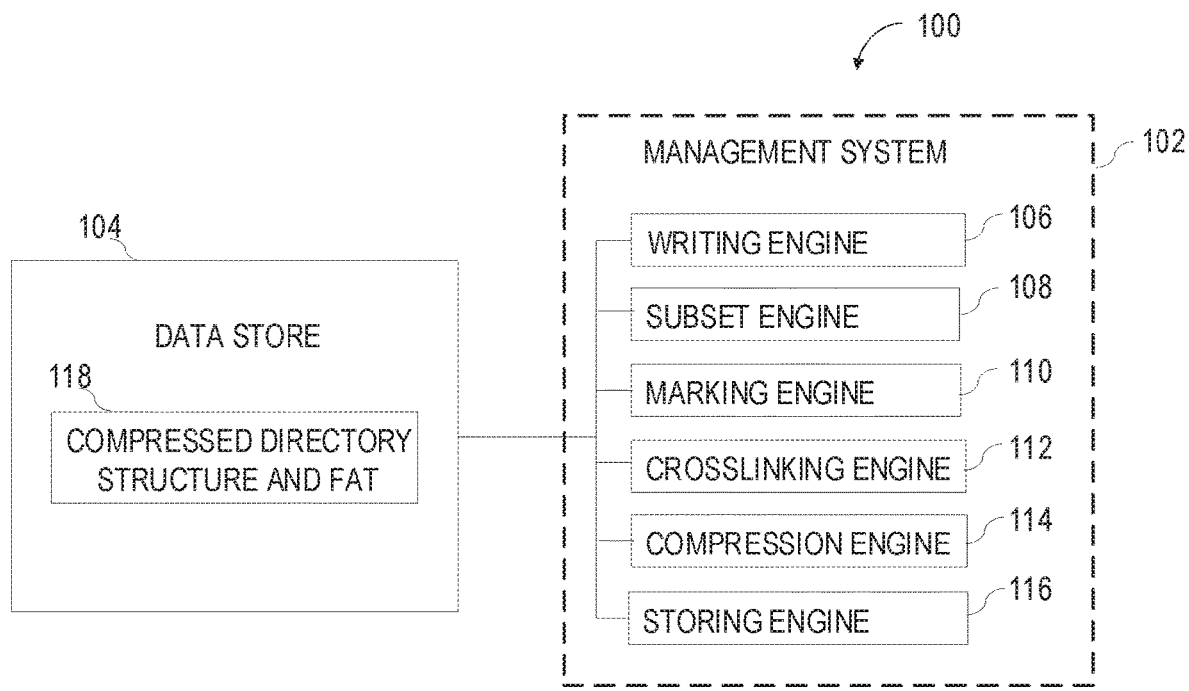
FIG. 1 is a diagram of an example of a system for file system storage according to the present disclosure.

FIG. 1 illustrates a diagram of an example of a system 100 for file system storage according to the present disclosure. The system 100 can include a data store 104, a management system 102, and/or a number of engines 106, 108, 110, 112, 114, 116. The management system 102 can be in communication with the data store 104 via a communication link, and can include, manage, and/or employ the number of engines (e.g., the writing engine 106, the subset engine 108, the marking engine 110, the crosslinking engine 112, the compression engine 114, and the storing engine 116) to perform various functions. The management system 102 can include additional or fewer engines than illustrated to perform the various functions described herein.

The number of engines 106, 108, 110, 112, 114, 116 can include hardware or a combination of hardware and programming to perform a number of functions described herein (e.g., writing a file system to a storage area of a computing device, the file system including a plurality of files, determining a subset of the plurality of files, marking each file of the plurality of files that is not included in the subset as a not-for-use sector, crosslinking duplicate files of the subset, compressing a directory structure and a file allocation associated with the subset, storing the compressed directory structure and FAT in the file system, etc.). The programming can include program instructions (e.g., software, firmware, etc.) stored in a memory resource (e.g., computer readable medium, machine readable medium, etc.) as well as hard-wired program (e.g., logic).

The writing engine 106 can include hardware and/or a combination of hardware and programming to write a file system to a storage area of a computing device, the file system including a plurality of files. The file system (e.g., a FAT32 file system) can include all files that are included in the plurality of subsets (described further below). The file system can be considered a cumulative superset of the files of the subsets. The file system can be written to a storage area of a memory device (e.g., a flash memory device on a server motherboard). Contents of the files included in the file system can be identified using a cryptographic hash function checksums (e.g., SHA-256 checksums). Within the file system, unique files can be stored once; that is, a single instance (e.g., copy) of each file can be stored on the memory device (e.g., in sector form).

The subset engine 108 can include hardware and/or a combination of hardware and programming to determine a subset of the plurality of files. A subset of the plurality of files can include a file of the plurality of files. A subset of the plurality of files can include a number of the plurality of files. The subset of the plurality of files can include files associated with (e.g., appropriate for) a particular parameter of a host (or a number of parameters of a host). Host parameters can include a location of a host, an OS type of a host, a purpose of a host, a platform type of a host, a language of a host, etc. A portion of the flash memory device (e.g., a service OS) may be used to determine the host parameter(s), for instance.

For example, a subset associated with a host located in China may include a file in a Chinese language version (rather than a version in the French language). In another example, a subset associated with a host having a specific purpose, such as a host with multiple video cards for rendering, may include files for particular (e.g., high-performance) drivers and/or software that may be inappropriate (e.g., harmful) and/or irrelevant (e.g., pertaining to a function not supported by a particular host) for a general purpose host. In another example, a subset associated with a host that uses a particular OS (e.g., Microsoft Windows 2008 R2™)

may not include files for particular (e.g., Microsoft Windows Server 8) drivers to prevent the host from accessing and/or using an incorrect version. As can be appreciated from this example, files not included in a particular subset can be sequestered (e.g., hidden) from a host by marking those files (e.g., via the marking engine 110).

The marking engine 110 can include hardware and/or a combination of hardware and programming to mark each file of the plurality of files that is not included in the subset as a not-for-use i.e., a not-for-use sector (e.g., a bad sector). Accordingly, not-for-use sectors (e.g., files included in the not-for-use sector) may not be accessible by the host and/or may not be presented to the host. It is noted that if the host is requested to perform a check, the check may yield file systems errors, though because the files may be read-only files, the host cannot perform operations on them.

The crosslinking engine 112 can include hardware and/or a combination of hardware and programming to crosslink duplicate files of the subset. Crosslinking duplicate files of the subset can allow examples herein to point all duplicate directory entries in the subset to the corresponding single block of data (e.g., single file) stored in the file system. For example, there may be multiple (e.g., a large number of) duplicate files in a distribution that may be taking up a large amount of space on a storage device. According to examples herein, the host may be "tricked" into seeing the multiple copies of a particular file when, on the file system, the single instance of the file in the file system is being accessed multiple times.

The compression engine 114 can include hardware and/or a combination of hardware and programming to compress a directory structure and a FAT associated with the subset. Each subset can have a directory structure and a FAT. The directory structure and the FAT for each subset can be compressed in various manners not limited by examples herein.

The storing engine 116 can include hardware and/or a combination of hardware and software and programming to store the compressed directory structure and a FAT (e.g., a compressed directory structure and FAT 118) in the file system. The compressed directory structure and a FAT 118 can be saved in a root directory of the storage device as a 'file' of the file system, for instance. The root directory can be a first directory (e.g., the directory at the highest level of a hierarchy).

Examples herein can include a decompression engine (not shown in FIG. 1). The decompression engine can be combined with the compression engine 114, for instance. The decompression engine can include hardware and/or a combination of hardware and programming to determine an association between the host and the subset, decompress the compressed directory structure and the FAT, and present the decompressed directory structure and the FAT to the host responsive to receiving a boot sequence (e.g., signal associated with a boot sequence) associated with the host.

Figure 2:
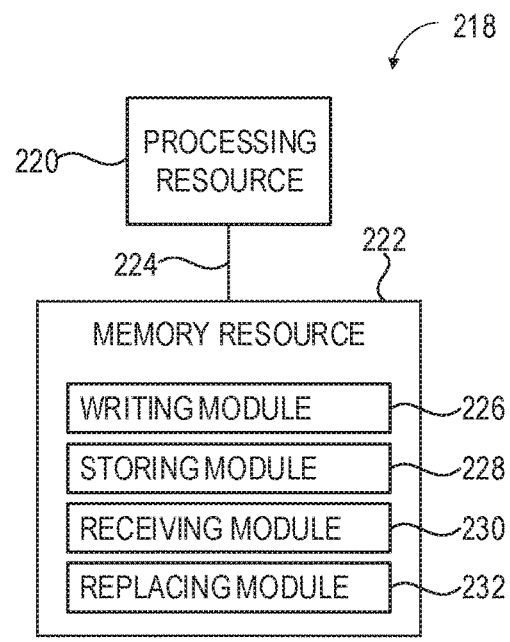
FIG. 2 is a diagram of an example computing device according to the present disclosure.

FIG. 2 illustrates a diagram of an example computing device 218 according to the present disclosure. The computing device 218 can utilize software, hardware, firmware, and/or logic to perform a number of functions described herein. The computing device 218 can be any combination of hardware and program instructions to share information. The hardware, for example, can include a processing resource 220 and/or a memory resource 222 (e.g., computer-readable medium (CRM), machine readable medium (MRM), database, etc.). A processing resource 220, as used herein, can include any number of processors capable of executing instructions stored by a memory resource 220.

The processing resource 220 may be implemented in a single device or distributed across multiple devices. The program instructions (e.g., computer readable instructions (CRI)) can include instructions stored on the memory resource 222 and executable by the processing resource 220 to implement a desired function (e.g., writing a file system to a storage area (e.g., flash memory) of a motherboard), the file system including a plurality of files, storing a respective directory structure and a respective FAT associated with each of a plurality of subsets of the plurality of files in a compressed format as a respective file of the file system, receiving an instruction to present a particular subset of the plurality of subsets to a host, replacing a directory structure and a FAT associated with the file system with a decompressed sector of the storage area associated with a particular file corresponding to the particular subset responsive to receiving the instruction, etc.).

The memory resource 222 can be in communication with a processing resource 220. A memory resource 222, as used herein, can include any number of memory components capable of storing instructions that can be executed by the processing resource 220. The memory resource 222 can be a non-transitory CRM or MRM. The memory resource 222 may be integrated in a single device or distributed across multiple devices. Further, the memory resource 222 may be fully or partially integrated in the same device as the processing resource 220 or it may be separate but accessible to that device and the processing resource 220. Thus, it is noted that the computing device 218 may be implemented on a participant device (e.g., host), on a server device, on a collection of server devices, and/or a combination of the participant device and the server device.

The memory resource 222 can be in communication with the processing resource 220 via a communication link (e.g., a path) 224. The communication link 224 can be local or remote to a machine (e.g., a computing device) associated with the processing resource 220. Examples of a local communication link 224 can include an electronic bus internal to a machine (e.g., a computing device) where the memory resource 222 is one of volatile, non-volatile, fixed, and/or removable storage medium in communication with the processing resource 220 via the electronic bus.

A number of modules 226, 228, 230, 232 can include CRI that when executed by the processing resource 220 can perform a number of functions. The number of modules 226, 228, 230, 232 can be sub-modules of other modules. For example, the writing module 226 and the storing module 228 can be sub-modules and/or contained within the same computing device. In another example, the number of modules 226, 228, 230, 232 can comprise individual modules at separate and distinct locations (e.g., CRM, etc.).

Each of the number of modules 226, 228, 230, 232 can include instructions that when executed by the processing resource 220 can function as a corresponding engine, including those as described herein. For example, the writing module 226 can include instructions that when executed by the processing resource 220 can function as the writing engine 106.

The receiving module 230 can include CRI that when executed by the processing resource 220 can receive an instruction to present a particular subset of the plurality of subsets to a host, and the replacing module 232 can include CRI that when executed by the processing resource 220 can replace a directory structure and a FAT associated with the file system with a decompressed sector of the storage area associated with a particular file corresponding to the particular subset responsive to receiving the instruction. As previously discussed, multiple different subsets of the file system can exist. To replace a default subset with another subset (e.g., to switch to a different driver subset) the host BIOS can search a directory of the file system (e.g., a root directory) and find sectors allocated to the file corresponding to the subset replacing the default subset in the file system. Then, the BIOS can carry out a sector copy/decompress from that file to the directory structure and FAT of the file system itself (allocated in a boot sector of the storage device). Thus, examples herein can replace a directory structure and a FAT associated with the file system with a decompressed sector of the storage area associated with a particular file corresponding to the particular subset. Accordingly, when a host boots, it can be presented with the subset (e.g., driver(s)) that replaced the default subset instead of the default subset.

Figure 3:
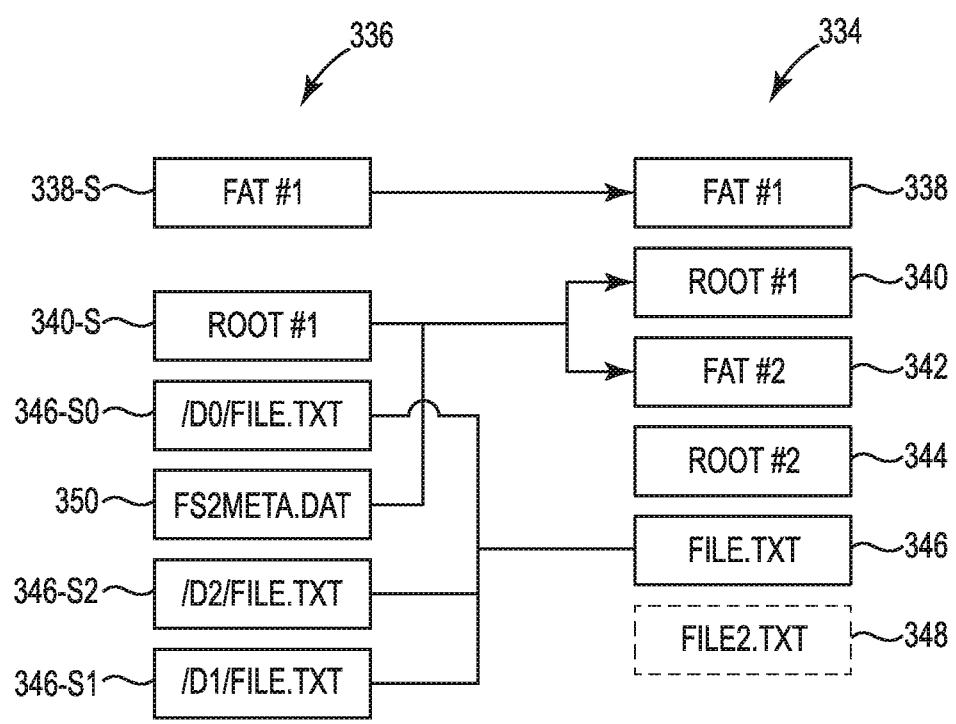
FIG. 3 is a diagram of an example of a file system and an example of a subset of the file system according to the present disclosure.

FIG. 3 is a diagram of an example of a file system 334 and an example of a subset 336 of the file system 334 according to the present disclosure. The file system 334 includes a number of example files 338, 340, 342, 344, 346, 348. It is noted that, as previously discussed, and as illustrated in FIG. 3, the file system 334 can store a single instance of each file therein. The example files include a FAT #1 file 338, a ROOT #1 file 340, a FAT #2 file 342, a ROOT #2 file 344, a file.txt file 346 and a file2.txt file 348.

The subset 336 includes a number of example files 338-S, 340-S, 346-S0, 346-S1, 346-S2, 350. The example files in the subset 336 include a FAT #1 file 338-S (e.g., analogous to FAT #1 file 338), a ROOT #1 file 340-S (e.g. analogous to ROOT #1 file 340), a /d0/file.txt file 346-S0 (e.g., an iteration analogous to file.txt file 346), a/d1/file.txt 346-S1 (e.g., a second iteration analogous to file.txt file 346), a /d/2/file.txt file 346-S2 (e.g., a third iteration analogous to file.txt file 346), and a Fs2meta.dat file 350.

Lines between files of file system 334 and/or files of subset 336 indicate relationships between such files. For example, the /d0/file.txt file 346-S0, the /d1/file.txt file 346-S1, and the /d/2/file.txt file 346-S2 are shown as being crosslinked to one another and as referencing the unique single instance of the file.txt file 346 in the file system 334. The file2.txt file 348 is illustrated with a dotted line indicating that it is not being accessed by (and may therefore be invisible to a host associated with) the subset 336. It is to be understood that the file2.txt file 348 can be accessed by different subsets (not illustrated in FIG. 3).

Figure 4:
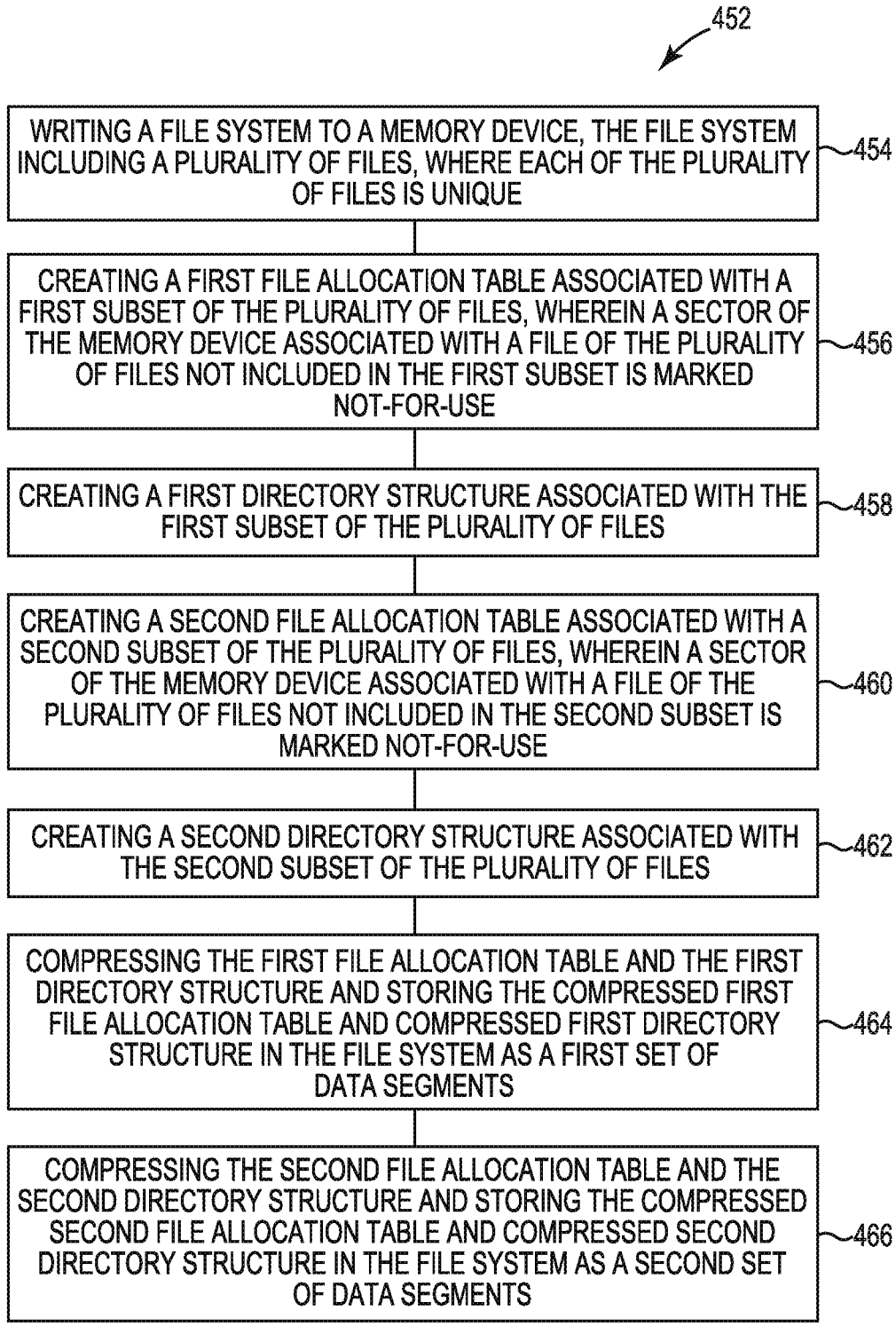
FIG. 4 is a flow chart of an example of a method for storing a file system according to the present disclosure.

FIG. 4 is a flow chart of an example of a method 452 for storing a file system according to the present disclosure. Method 452 can be performed by a computing device (e.g., computing device 218, previously described in connection with FIG. 2), for instance.

At 454 the method 452 can include writing a file system to a memory device, the file system including a plurality of files, where each of the plurality of files is unique. The file system (e.g., a FAT32 file system) can include all files that are included in the plurality of subsets (described further below). The file system can be considered a cumulative superset of the files of the subsets. The file system can be written to a storage area of a memory device (e.g., a flash memory device on a server motherboard). Within the file system, unique files can be stored once; that is, a single instance (e.g., copy) of each file can be stored on the memory device (e.g., in sector form).

At 456 the method 452 can include creating a first FAT associated with a first subset of the plurality of files, where a sector of the memory device associated with a file of the plurality of files not included in the first subset is marked not-for-use. A subset of the plurality of files can include a file of the plurality of files. A subset of the plurality of files can include a number of the plurality of files. The subset of the plurality of files can include files associated with (e.g., appropriate for) a particular parameter of a host (or a number of parameters of a host), as previously discussed.

At 458 the method 452 can include creating a first directory structure associated with the first subset of the plurality of files. The first directory structure can be analogous to the directory structure illustrated in FIG. 3 (e.g., subset 336), for instance.

At 460 the method 452 can include creating a second FAT associated with a second subset of the plurality of files, where a sector of the memory device associated with a file of the plurality of files not included in the second subset is marked not-for-use. Not-for-use sectors (e.g., files included in the not-for-use sector) may not be accessible by the host and/or may not be presented to the host.

At 462 the method 452 can include creating a second directory structure associated with the second subset of the plurality of files. The second directory structure can be analogous to the directory structure illustrated in FIG. 3 (e.g., subset 336), for instance.

At 464 the method can include compressing the first FAT and the first directory structure and storing the compressed first FAT and compressed first directory structure in the file system as a first file. Modes of compressing a FAT and/or directory structures are not limited in examples discussed herein. The first FAT and the first directory structure can be stored in a root directory of a storage device, for instance.

At 466 the method can include compressing the second FAT and the second directory structure and storing the compressed second FAT and compressed second directory structure in the file system as a second file. The second FAT and the second directory structure can be stored in a root directory of a storage device, for instance.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of engines" can refer to one or more engines.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for storing a file system, comprising a processing resource in communication with a non-transitory computer readable medium having instructions executable by the processing resource to implement a writing engine, a subset engine, a marking engine, a compression engine, and a storing engine, wherein:
   the writing engine writes a file system to a storage area of a computing device, the file system including a plurality of files;
   the subset engine determines a subset of the plurality of files;
   the marking engine marks each file of the plurality of files that is not included in the subset as a not-for-use sector;

the crosslinking engine crosslinks a number of duplicate files of the subset to a single file of the file system to manage access to the single file by a host a plurality of times equivalent to the number of duplicate files;

the compression engine compresses a directory structure and a file allocation table (FAT) associated with the subset; and the storing engine stores the compressed directory structure and the FAT in the file system.

2. The system of claim 1, wherein the file system is a FAT32 file system.

3. The system of claim 1, including instructions to implement the storing engine to store the compressed directory structure and the FAT in a root directory of the file system.

4. The system of claim 1, including instructions to implement the writing engine to write the file system to the storage area in a normalized format.

5. The system of claim 1, including instructions to implement a decompression engine to:
determine an association between the host and the subset;
decompress the compressed directory structure and the FAT; and
present the decompressed directory structure and the FAT to the host responsive to receiving a boot sequence associated with the host.

6. The system of claim 1, including instructions to implement the writing engine to identify a content of each of the plurality of files included in the file system using a cryptographic hash function checksum.

7. The system of claim 1, including instructions to implement the subset engine to determine the subset based on one or more parameters associated with the host.

8. The system of claim 1, including instructions to:
implement the subset engine to determine the subset to enable presenting the subset to the host; and
implement the marking engine to prevent presenting to the host each file of plurality of files that is not included in the subset.

9. A method for storing a file system, comprising:
writing a file system to a memory device, the file system including a plurality of files, wherein each of the plurality of files is unique;
creating a first file allocation table (FAT) associated with a first subset of the plurality of files, wherein a sector of the memory device associated with a file of the plurality of files not included in the first subset is marked not-for-use;
creating a first directory structure associated with the first subset of the plurality of files;
creating a second FAT associated with a second subset of the plurality of files, wherein a sector of the memory device associated with a file of the plurality of files not included in the second subset is marked not-for-use;
creating a second directory structure associated with the second subset of the plurality of files;
compressing the first FAT and the first directory structure and storing the compressed first FAT and compressed first directory structure in the file system as a first set of data segments; and
compressing the second FAT and the second directory structure and storing the compressed second FAT and compressed second directory structure in the file system as a second set of data segments;
wherein one or both of the first directory structure and the second directory structure crosslinking a number of duplicate files of the corresponding subset to a single file of the file system to manage access to the single file by a host a plurality of times equivalent to the number of duplicate files.

10. The method of claim 9, wherein the memory device is a flash memory device.

11. The method of claim 9, further comprising:
determining one or both of the first subset or the second subset based on one or more parameters associated with the host.

12. The method of claim 9, the first subset and the second subset for presenting to the host.

13. The method of claim 12, further comprising:
presenting the first subset to the host, the presenting the first subset comprising decompressing and copying the compressed first FAT and compressed first directory structure over a root directory and FAT area of the memory device; or
presenting the second subset to the host, the presenting the second subset comprising decompressing and copying the compressed second FAT and compressed second directory structure over the root directory and FAT area of the memory device.

14. The method of claim 13, further comprising:
determining a language associated with the host; and
presenting the first subset or the second subset to the host based on the language.

15. The method of claim 13, further comprising:
determining an operating system type associated with the host; and
presenting the first subset or the second subset to the host based on the operating system type.

16. The medium of claim 13, further comprising:
determining a platform type associated with the host; and
presenting the first subset and second subset to the host based on the platform type.

17. The method of claim 9, the sector is marked not-for-use to prevent presenting to the host each file of the plurality of files that is not included in the first subset and the second subset.

18. A non-transitory computer readable medium storing instructions executable by a processing resource to cause a computer to:
write a file system to a storage area of a motherboard, the file system including a plurality of files;
store a respective compressed directory structure and a respective compressed file allocation table (FAT) associated with each of a plurality of subsets of the plurality of files as a respective file of the file system;
receive an instruction to present a particular subset of the plurality of subsets to a host, the particular subset having an associated directory structure crosslinking a number of duplicate files of the particular subset to a single file of the file system to manage access to the single file by the host a plurality of times equivalent to the number of duplicate files; and
replace a directory structure and a FAT associated with the file system with a decompressed sector of the storage area associated with a particular file corresponding to the particular subset responsive to receiving the instruction.

19. The medium of claim 18, wherein the instructions are executable to replace the directory structure and the FAT without a compressed file system driver associated with the host and without any modifications to the file system made by an additional device.

* * * * *